July 15, 1941.                J. T. CATLETT ET AL                2,249,457
                                ARC WELDING SYSTEM
                                Filed Feb. 24, 1940

Inventors:
James T. Catlett,
Jasper E. Anderson,
by Harry E. Dunham
   Their Attorney.

Patented July 15, 1941

2,249,457

UNITED STATES PATENT OFFICE 2,249,457

ARC WELDING SYSTEM

James T. Catlett, Scotia, N. Y., and Jasper E. Anderson, Saugus, Mass., assignors to General Electric Company, a corporation of New York Application February 24, 1940, Serial No. 320,594

9 Claims. (Cl. 219—8)

Our invention relates to electric control systems, and more particularly to arc welding systems embodying certain protective arrangements primarily intended to insure the personal safety of welding operators.

It is an object of our invention to provide an arc welding system in which normal arc welding current and voltage are conveniently available for welding without imposing unnecessary hazards on the welding operator due to prolonged open circuit or short circuit conditions in the welding circuit.

It is a further object of our invention to provide a control system in which normal arc welding current and voltage are available for a predetermined period of time before welding, during welding, and for a predetermined period of time after a welding operation has been interrupted.

It is also an object of our invention to provide a control system in which a reduced current and open circuit voltage are available in the welding circuit before welding and in which normal arc welding current and voltage are available during welding and for a short period of time after a welding operation has been interrupted.

Further objects of our invention will become apparent from the following description thereof.

For certain arc welding operations, and particularly when using alternating current, the open circuit voltage of an arc welding circuit may be as high as 100 volts. A prolonged application of voltage of this magnitude may be physiologically dangerous to an operator, particularly under conditions of perspiration, moisture and restriction of movement frequently encountered in welding. Furthermore, short circuit conditions at the welding station are liable to damage the welding system and are also productive of certain elements of danger to the operator because of the possibility of starting a fire when he is incapacitated and consequently not able to respond to this threat to his personal safety. Systems embodying our invention protect the operator from these personal hazards and also insures protection of the arc welding system.

Figure 1:
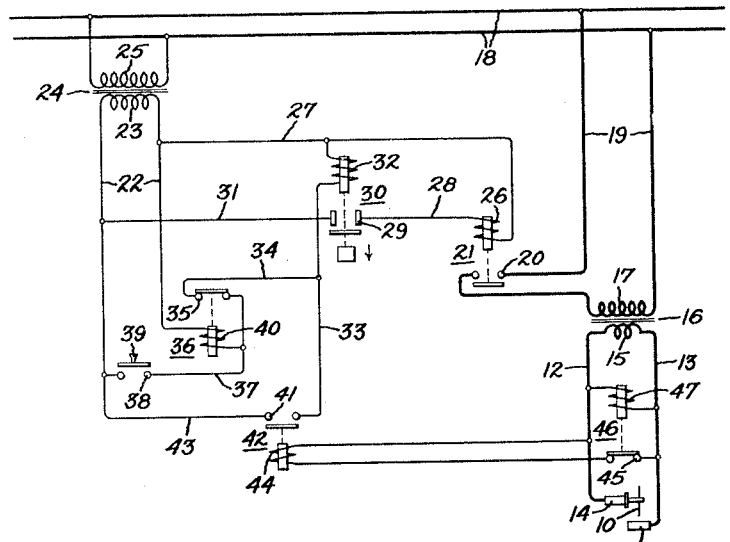
Figure 2:
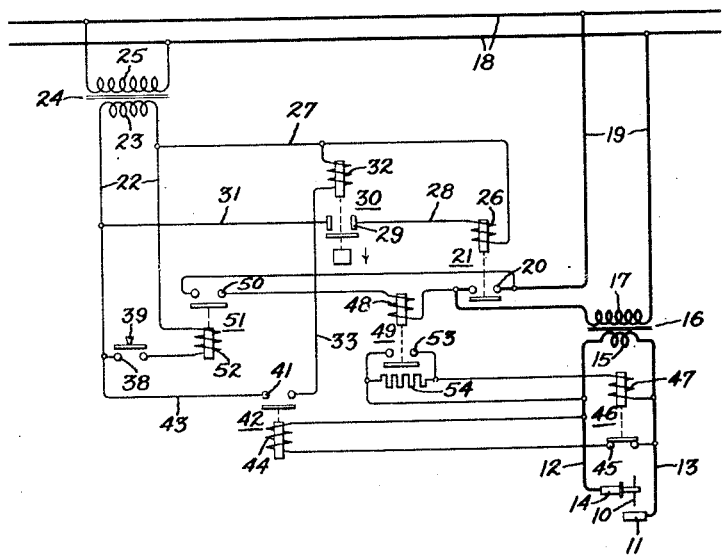

In the accompanying drawing, Fig. 1 diagrammatically represents one embodiment of our invention, and Fig. 2 diagrammatically represents another embodiment thereof.

In Fig. 1, energy is supplied to a welding arc established between an electrode 10 and the work 11 through a welding circuit 12, 13, one terminal of which is connected to the work 11 and the other terminal of which is connected to the electrode 10 through the agency of an electrode holder 14. The welding circuit 12, 13 is connected to the secondary 15 of an arc welding transformer 16 whose primary 17 is connected to the source of supply 18 through conductors 19 and the contacts 20 of a contactor 21. The welding transformer 16 may be of the usual type having a drooping voltage characteristic obtained by reason of its internal reactance.

A source of control voltage 22 is provided by the secondary 23 of a transformer 24 whose primary 25 may also be connected to the source of supply 18. The operating winding 26 of contactor 21 is connected across this control voltage through conductors 27, 28, contacts 29 of a time element relay 30, and a conductor 31. As illustrated in the drawing, relay 30 has a delayed opening characteristic so that its contacts 29 are maintained closed for a predetermined period of time after it has been deenergized.

The operating winding 32 of time element relay 30 may be connected across control voltage 22 through conductors 27, 33 and 34, contacts 35 of auxiliary control relay 36, conductor 37 and the contacts 38 of a switch 39. The closure of contacts 38 of switch 39 also connects the operating winding 40 of auxiliary control relay 36 to the source of control voltage 22. The operating characteristics of relays 30 and 36 are such that relay 30 closes its contacts 29 before relay 36 opens its contacts 35.

The winding 32 of time element relay 30 may also be connected across the source of control voltage 22 through conductors 27 and 33, contacts 41 of relay 42 and conductor 43. The operating winding 44 of relay 42 is connected across the arc welding circuit 12, 13 through the contacts 45 of a relay 46 having its operating winding 47 also connected across the arc welding circuit. Relay 46 is designed to have a pick-up voltage slightly above the maximum desired arc welding voltage and relay 42 is designed to have a pick-up voltage slightly above the minimum voltage which will sustain an arc. These relays determine the range of operating voltage for the welding arc and for convenience are hereafter referred to as maximum and minimum voltage relays.

The organization of the control system of Fig. 1 will be further described in connection with its operation.

Contactor 21 and relays 30, 36, 42 and 46 are shown in Fig. 1 in the positions they assume when deenergized. It will be noted that the welding circuit 12, 13 is deenergized because its connection with the source of supply 18 is interrupted at contacts 20 of contactor 21.

When the operator is ready to start a welding operation he closes switch 39. The closure of this switch energizes the operating winding 32 of time element relay 30 from one terminal of the source of control voltage 22 through conductors 27, 33 and 34, contacts 35, of relay 36, conductor 37 and contacts 38 of switch 39 to the other terminal of the source of control voltage 22. The closure of switch 39 simultaneously energizes the operating winding 40 of auxiliary control relay 36 through conductor 37 and contacts 38 of switch 39. As noted above, however, the operating characteristics of relays 30 and 36 are such that relay 36 does not open its contacts 35 until after the operating winding 32 of relay 30 has closed its contacts 29. Consequently, the arrangement provided insures a momentary energization of time element relay 30 by the closure of switch 39.

The closure of contacts 29 of time element relay 30 connects the operating winding 26 of contactor 21 across the source of control voltage 22 through conductors 27 and 28, contacts 29 of time element relay 30 and conductor 31. Thus, depending on the delayed opening characteristics of the time element relay 30, contactor 21 is energized for a predetermined period of time.

When energized, contactor 21 closes its contacts 20 connecting the welding circuit 12, 13 to the source of supply 18. If during the time that contacts 20 of the contactor 21 are closed the welding operator initiates a welding arc and proceeds to weld, minimum voltage relay 42 will close its contacts 41 and connect the operating winding 32 of time element relay 30 across the source of control voltage through conductors 27 and 33, contacts 41 of relay 42 and conductor 43. The reenergization of time element relay 30 will maintain its contacts 29 closed, and consequently, the energization of contactor 21 which will maintain its contacts closed so long as the welding operation proceeds. If the welding arc is interrupted or goes out, maximum voltage relay 46 opens its contacts 45, deenergizes the minimum voltage relay 42 which opens its contacts 41, thus deenergizing the time element relay 30. Unless the arc is restruck within the time delay opening period of the relay 30, contactor 21 will become deenergized opening its contacts 20 and thereby disconnecting the welding circuit 12, 13 from the source of supply 18.

It will be noted that if during the period that the welding circuit 12, 13 is energized, the operator touches electrode 10 to the work 11 thus shorting the arc welding circuit, minimum voltage relay 42 will not be energized to close its contacts 41 and after a period of time determined by the delayed opening characteristics of relay 30, the arc welding circuit 12, 13 will be disconnected from the source 18 by the opening of contacts 29 of relay 30 which deenergizes the contactor 21 causing it to open its contacts 20.

If the welding circuit has been deenergized through the operation of either the maximum voltage relay 46 or the minimum voltage relay 42 and the consequent opening, after a predetermined time, of relay 30, it cannot again be reenergized without again closing switch 39 to establish a sequence of operation such as above described. It will also be noted that due to the action of the auxiliary control relay 36, maintaining the switch 39 closed has no effect on the operation of time element relay 30 and the consequent operation of the system. In fact, before the time element relay 30 may again be reenergized preparatory to initiating another welding operation, the switch 39 must be opened and again closed if it has been held closed.

The embodiment of our invention shown in Fig. 2 is quite similar to that shown in Fig. 1 except that the arc welding circuit operates at a reduced open circuit voltage when switch 39 is closed preparatory to initiating a welding operation. This reduced voltage will supply a current sufficient to produce an arc that ionizes the gap between the electrode and the work without causing the electrode to stick to the work when it is brought into engagement therewith. This modification of Fig. 1 is obtained by connecting the arc welding circuit to the source of supply through a voltage reducing means and simultaneously rendering the maximum voltage relay responsive to the reduced voltage of the arc welding circuit resulting from this connection.

In Fig. 2 those parts of the control system corresponding to those previously described in connection with Fig. 1 have been identified by like reference numerals. The voltage reducing means connected between the welding circuit 12, 13 and the source of supply 18 consists of the operating winding 48 of a relay 49. The impedance of this winding is matched to the exciting current of the welding transformer so that its secondary voltage is reduced the desired amount. As shown in Fig. 2, it is connected in shunt to the contacts 20 of contactor 21 through a circuit including contacts 50 of a relay 51 whose operating winding 52 is connected across the control voltage 22 through the contacts 38 of switch 39.

The operating characteristics of relay 49 are such that when its winding 48 is connected to the source of supply 18 in circuit with the primary 17 of the welding transformer, it closes its contacts 53 which are in shunt to a voltage reducer 54 connected in circuit with the operating winding 47 of maximum voltage relay 46. When the operating winding 48 of relay 49 is deenergized by the closing of contacts 20 of contactor 21, voltage reducer 54 is again inserted in circuit with the operating winding 47 of maximum voltage relay 46. This restores the normal operating characteristics of maximum voltage relay 46 so that it opens its contacts 45 at a voltage slightly above the maximum desired arc welding voltage. In the arrangement illustrated, the voltage reducer has been illustrated as a resistor but it may take other desired forms.

The operation of this system is as follows: When the operator is ready to start a welding operation, he closes the switch 39. This energizes the operating winding 52 of relay 51 by connecting it across the source of control voltage 22 through the contacts 38 of switch 39. Relay 51 thus closes its contacts 50 connecting the operating winding 48 of relay 49 across the contacts 20 of contactor 21. So long as the operator maintains the switch 39 closed, a reduced voltage appears across the arc welding circuit 12, 13 which is connected through the welding transformer 16 and the operating winding 48 of relay 49 to the source of supply 18. This connection causes relay 49 to close its contacts 53 shunting resistor 54 in circuit with the operating winding 47 of maximum voltage relay 46 which will consequently open its contacts 45 in response to the reduced open circuit voltage in the welding circuit 12, 13. As soon as the operator touches the electrode 10 to the work 11, maximum voltage relay 46 is deenergized closing its contacts 45, thus establishing an energizing circuit for the operating winding 44 of minimum voltage relay 42. When the operator withdraws the electrode 10 from the work 11 striking an ionizing arc with the reduced voltage available in the welding circuit 12, 13, the minimum voltage relay 42 closes its contacts 41 thus energizing the operating winding 32 of time element relay 30 through a circuit including conductors 27 and 33, contacts 41 of minimum voltage relay 42, and conductor 43. This causes time element relay 30 to close its contacts 29, thus energizing the operating winding 26 of contactor 21 from the source of control voltage 22 through a circuit including conductors 27 and 28, contacts 29 of time element relay 30 and conductor 31. Contactor 21 thus closes its contacts 20 connecting the welding circuit 12, 13 through the welding transformer 16 directly to the source of supply 18 for supplying normal arc welding current and voltage thereto. The closure of contacts 20 of contactor 21 short circuits the operating winding 48 of relay 49 which is thus deenergized opening its contacts 53 and inserting resistor 54 in circuit with the operating winding 47 of maximum voltage relay 46. Thereafter the system operates in the manner above described in connection with Fig. 1.

In the system of Fig. 2, it will be noted that before welding a reduced open circuit voltage is supplied to the arc welding circuit 12, 13 so long as the switch 38 is closed and that this reduced open circuit voltage is not changed to the normal open circuit voltage until after the electrode 10 has been touched to the work 11 and withdrawn therefrom to strike an ionizing arc which is immediately converted into a power arc upon the operation of contactor 21. After welding has once progressed, however, full open circuit voltage is available for an interval of time determined by time element relay 30 so that the operator may restrike his arc with full open circuit voltage when the electrode is hot. As previously pointed out, the low open circuit voltage available before initiating the welding arc minimizes the possibility of the electrode freezing to the work when the operator touches it to the work at the beginning of a welding operation.

The push button switch 39 may be located on the electrode holder 14 or connected through a separate control cable extending from the control panel to the welder's station. It may, of course, be located directly on the control panel.

Although our invention has been described above in connection with alternating current arc welding systems, it is of course apparent that it is equally applicable to direct current arc welding systems. These systems may be variously modified without departing from the spirit and scope of our invention. For example, relays of different constructions controlling connections differently arranged may be used instead of those illustrated. In fact, electric valve circuits may be substituted for some or all of the electromagnetic relays and switches above described without departing from our invention. It is also apparent that parts of the systems described may be omitted by incorporating their function in the remaining parts of the systems. We aim, consequently, to cover by the appended claims all those modifications which fall within the true spirit and scope of our invention.

What we claim as new and desire to secure by Letters Patent of the United States, is:

1. An arc welding system comprising a source of supply, an arc welding circuit, and means responsive to the operation of maximum and minimum voltage relays connected to be responsive to the voltage of said arc welding circuit for controlling the connection of said arc welding circuit with said source of supply.

2. An arc welding system comprising a source of supply, an arc welding circuit, means including a time element relay for connecting said arc welding circuit to said source of supply and for maintaining said connection for a predetermined period of time after said time element relay has been operated, and means including maximum and minimum voltage relays connected to be responsive to the voltage of said arc welding circuit for controlling the operation of said time element relay.

3. An arc welding system comprising a source of supply, an arc welding circuit, means for connecting said arc welding circuit with said source of supply for a predetermined period of time, and means responsive to predetermined maximum and minimum voltage values of said arc welding circuit for maintaining the connection of said arc welding circuit with said source of supply while the voltage of said welding circuit is between said maximum and minimum values.

4. An arc welding system comprising a source of supply, an arc welding circuit, means for connecting said arc welding circuit with said source of supply for a predetermined period of time, and means responsive to predetermined maximum and minimum voltage values of said arc welding circuit for maintaining the connection of said arc welding circuit with said source of supply while the voltage of said welding circuit is between said maximum and minimum values and for a predetermined period of time after the voltage of said welding circuit changes to a value greater or less than said maximum and minimum values.

5. An arc welding system comprising a source of supply, an arc welding circuit, means including a time element relay for connecting said welding circuit with said source of supply and for maintaining said connection for a predetermined period of time after said time element relay is deenergized, switching means for momentarily energizing said time element relay, and means including maximum and minimum voltage relays connected to be responsive to the voltage of said arc welding circuit for controlling independently of said switching means the energization of said time element relay.

6. An arc welding system comprising a source of supply, an arc welding circuit, means including a time element relay for connecting said welding circuit with said source of supply and for maintaining said connection for a predetermined period of time after said time element relay is deenergized, means including a switch and an auxiliary control relay for momentarily energizing said time element relay, and means including relays responsive to predetermined maximum and minimum values of voltages in said welding circuit for maintaining the energization of said time element relay so long as the voltage of said welding circuit is between said maximum and minimum values of voltage.

7. An arc welding system comprising a source of supply, an arc welding circuit, means including maximum and minimum voltage relays connected to be responsive to the voltage of said arc welding circuit for controlling the direct connection of said arc welding circuit to said source of supply, and means for connecting said arc welding circuit to said source of supply through a voltage reducing means and simultaneously rendering said maximum voltage relay responsive to the reduced voltage of said arc welding circuit resulting from said connection.

8. An arc welding system comprising a source of supply, an arc welding circuit, means including a time element relay for completing a normal operating connection between said arc and said source of supply and for maintaining said connection for a predetermined period of time after said time element relay is deenergized, means including relays responsive to predetermined maximum and minimum voltage values of said arc welding circuit for maintaining the energization of said time element relay so long as the voltage of said arc welding circuit is between said maximum and minimum voltage values, means for connecting said welding circuit to said source of supply through a winding of sufficient impedance to reduce the normal operating open circuit voltage of said welding circuit to a predetermined value, and means responsive to the energization of said winding for rendering said maximum voltage relay responsive to the reduced open circuit voltage of said arc welding circuit resulting from the connection of said impedance winding.

9. An arc welding system comprising a source of supply, an arc welding circuit, means including a time element relay for completing a normal operating connection between said arc welding circuit and said source of supply and for maintaining said connection for a predetermined period of time after said time element relay is deenergized, means including relays responsive to predetermined maximum and minimum voltage values of said arc welding circuit for maintaining the energization of said time element relay so long as the normal operating voltage of said arc welding circuit is between said maximum and minimum voltage values, a voltage reducer for changing the calibration of said maximum voltage relay from operation at a reduced open circuit voltage to operation at said predetermined maximum normal open circuit voltage, a voltage reducing relay having contacts shunting said voltage reducer and a winding of sufficient impedance to secure a desired reduction of the normal operating voltage between said source of supply and said welding circuit, and means for connecting said welding circuit to said source of supply through the winding of said voltage reducing relay to reduce the open circuit voltage of said welding circuit and to operate said relay to close its contacts and shunt said voltage reducer.

JAMES T. CATLETT.
JASPER E. ANDERSON.